United States Patent [19]

Becher et al.

[11] E Re. 29,163

[45] Reissued Mar. 29, 1977

[54] 1,2,3,4,10,19-HEXANOR-9-OXO-5,9-SECO-25D-SPIROSTAN-5-OIC ACID

[75] Inventors: Elisabeth Becher, Basel; Hans Els, Lupsingen; Arno Johannes Schocher, Benken, all of Switzerland

[73] Assignee: Hoffmann-La Roche Inc., Nutley, N.J.

[22] Filed: Mar. 9, 1976

[21] Appl. No.: 665,204

Related U.S. Patent Documents

Reissue of:

[64] Patent No.: 3,634,461
Issued: Jan. 11, 1972
Appl. No.: 9,949
Filed: Feb. 9, 1970

[30] Foreign Application Priority Data

Mar. 3, 1969 Switzerland ..... 3201/69

[52] U.S. Cl. ..... 260/345.7; 260/343.2 S; 260/345.9; 195/51 R; 195/51 E

[51] Int. Cl.[2] ..... C07D 309/22

[58] Field of Search ..... 260/345.7

[56] References Cited

UNITED STATES PATENTS

| | | | |
|---|---|---|---|
| 3,068,244 | 12/1962 | Zderic | 260/345.7 |
| 3,102,892 | 9/1963 | Zderic | 260/345.7 |

*Primary Examiner*—James O. Thomas, Jr.
*Assistant Examiner*—Nicky Chan
*Attorney, Agent, or Firm*—Samuel L. Welt; George M. Gould

[57] ABSTRACT

The spirostan derivative 1,2,3,4,10,19-hexanor-[5]9-oxo-5,9-seco-25D-spirostan-5-oic acid is obtained by the microbiological degradation of diosgenin utilizing Proactinomyces restrictus Turfitt CBS 157.45 or enzymes derived therefrom. The aforesaid spirostan derivative is useful as an intermediate in the synthesis of medicinally valuable 9β,10α-steroids and nor-steroids.

1 Claim, No Drawings

1,2,3,4,10,19-HEXANOR-9-OXO-5,9-SECO-25D-SPIROSTAN-5-OIC ACID

Matter enclosed in heavy brackets [ ] appears in the original patent but forms no part of this reissue specification; matter printed in italics indicates the additions made by reissue.

BRIEF DESCRIPTION OF THE INVENTION

The present invention relates to the new spirostan derivative 1,2,3,4,10,19-hexanor-[5] 9-oxo-5,9-seco-25D-spirostan-5-oic acid and the process for its preparation by degradation of diosgenin utilizing a culture of Proactinomyces restrictus Turfitt CBS 157.45 or enzymes obtained therefrom.

The process of this invention may be conducted in analogous manner to the known procedures for the aerobic fermentation of steroids with microorganisms.

The microorganisms useful in the practice of the present invention can be grown on a solid or liquid nutrient medium which contains an available nitrogen source and an available carbon source as well as inorganic salts.

Suitable available nitrogen sources include animal, plant, microbial and inorganic compounds such as, for example, meat extract, peptones, corn steep, yeast extract, glycine, sodium nitrate and the like, as well as mixtures of the various types of nitrogen sources mentioned above.

Suitable available carbon sources include all sugars and polymers thereof such as, for example, glucose, maltose, saccharose, starch and dextrin, as well as amino acids, proteins, peptones, fatty acids, or fats of any form. It is also possible to employ mixtures of these various types of carbon sources.

The medium can contain trace elements such as iron, sulfur and phosphorus existing naturally or added from available mineral or organic components.

As needed or desired, growth factors or stimulants such as vitamins (especially biotin or pyridoxin) or auxins, such as indole acetic acid may be added to the medium.

The medium can be sterilized to protect against infection and additionally it can be supplied with inhibitors of bacterial growth such as benzoates, antibiotics, etc.

The pH value of the medium prior to inoculation should be adjusted to the range 4–9, preferably to the range 5–8. The culture of the microorganisms can be successfully practiced in a manner known per se, such as in a stirred or shaken fermentor at 18–40° C., preferably at 28° C.

The diosgenin can be added to the fermenting mixture at any time during the development of the microorganism, even prior to the sterilization of the nutrient medium. As a rule it is preferable to allow for an incubation period for the organism of 15–96 hours before adding the diosgenin. The diosgenin can be added in any desired form, it however, is most advantageous to utilize a method wherein maximum surface contact between the steroid and the microorganism can be established. This can be accomplished for example, by mechanical dispersion or dispersing agents or by solution in an organic solvent such as for example, acetone, propylene glycol, dimethylsulfoxide, alcohols or dimethylformamide.

After conclusion of the fermentation, the resulting steroid is isolated from the ferment medium. Particularly useful for this purpose is extraction with a water immiscible solvent for steroids, such as dichloromethane, chloroform, ethyl acetate, methyl isobutyl ketone, trichloroethylene, etc.

The cellular substance can be separately extracted with the above stated solvents and also with water miscible solvents such as, for example, acetone, dimethyl sulfoxide, ethyl alcohol, etc. The desired product can be purified by recrystallization, chromatography and counter-current distribution and can thus be separated from the undesired products in the fermentation extracts.

The 1,2,3,4,10,19-hexanor-[5] 9-oxo-5,9-seco-25D-spirostan-5-oic acid is useful as an intermediate in the preparation of medicinally valuable steroids, e.g., 9β,10α-steroids. This compound can be converted by conventional procedures into deA-25D spirost-9-en-5-one, which in turn, by known degradation of the diosgenin side chain per Fieser and Fieser, Steroids; New York, 1959, page 549 et seq. and in analogy to known processes through hydrogenation of the 9,10-double bond and condensation with methyl vinyl ketone can be converted into a 9β,10α-steroid:

A mixture of 400 ml. of ethyl acetate, 0.5 ml. of 72% perchloric acid and 48 ml. of acetic anhydride was diluted to a final volume of 500 ml. with added ethyl acetate. A total of 400 ml. of this solution was stirred for 25 minutes at room temperature under nitrogen with 7.28 g. of 1,2,3,4,10,19-hexanor-[5] 9-oxo-5,9-seco-25D-spirostan-5-oic acid and then the resulting solution was added to 300 ml. of cold, saturated sodium bicarbonate solution. The ethyl acetate phase was separated, washed with water, dried over sodium sulfate and evaporated in vacuo. The residue was taken up in benzene/ether, filtered through 80 g. of Kieselgel and the filtrate evaporated. The 34.6 g. of residue obtained was dissolved in 250 ml. of tetrahydrofuran and this solution was treated dropwise with stirring at about 70° C. with 55 ml. of a 2 molar ethereal solution of ethyl magnesium bromide. The reaction mixture was stirred for 2.5 hours under nitrogen at about −50 to −60° C. and then allowed to slowly warm to 0° C. The solution was added to an ice-cold, saturated solution of ammonium chloride and mixed with 1.75 l. of ether. The organic phase was separated, washed with cold sodium bicarbonate solution and then with water, dried over sodium sulfate and evaporated in vacuo. The residue was dissolved in methylene chloride and filtered through 35 g. of Kieselgel. Evaporation of the filtrate yielded an oil. A solution of 18.8 g. of this oil and 16.89 g. of potassium hydroxide in 200 ml. of ethanol and 45 ml. of water was stirred for 3 hours at room temperature under nitrogen. The reaction mixture was then added to 2 l. of ice water and the resulting mixture extracted with 2 l. of methylene chloride. The organic phase was washed with saturated brine, dried over sodium sulfate and evaporated in vacuo. The residue was chromatographed on 600 g. of Kieselgel. Elution with benzene/cyclohexane/ether (10:10:1) yielded deA-25D-spirost-9-en-5-one which was recrystallized from acetone/hexane.

The present invention is illustrated by the following example:

EXAMPLE

(a) Preparation of the shake culture

A slant consisting of 1% Difco-Neopeptone, 4% maltose, and 1.5% agar in tap water was inoculated with Proactinomyces restrictus Turfitt CBS 157.45 and incubated for 3 days at 28° C. An Erlenmeyer flask containing 100 ml. of a nutrient medium consisting of 0.25% NaCl, 0.4% peptone, 1% glucose, 0.4% meat extract and 0.1% yeast extract in distilled water was carefully inoculated with the aforesaid culture. The medium was sterilized prior to inoculation and the pH after sterilization was about 6.3. The shake culture was incubated at 28° for 24 hours.

(b) Fermentation

A small fermentor containing 8 l. of the same nutrient medium mixture used in the shake culture was sterilized and then inoculated with the contents of the shake flask. It was incubated 24 hours with stirring at 28° C. and aerated with 5–6 l. of air/minute. Then under sterile conditions there was added 60 ml. of a 3⅓% solution of diosgenin in dimethylformamide. The aeration rate during the fermentation can be reduced to 2–4 l./minute if there is foaming.

The course of the fermentation can be followed by sampling the fermentation broth, extracting the sample at pH 2 with chloroform and then analyzing the extract by thin layer chromatography. The fermentation is completed in about 70 hours.

(c) Isolation of the reaction product

The contents of three small fermentors were combined and the cellular substance removed by centrifuging. The mycelium was washed with 7 l. of water and the wash water was combined with the culture filtrate. The solution was adjusted to pH 2 with hydrochloric acid and extracted twice with 20-l. portions of dichloromethane. The extract was evaporated in vacuo to dryness. The residue (12 g.) was taken up in 2 l. of dichloromethane, the solution was extracted with 6 l. of saturated sodium bicarbonate solution, this extract was adjusted to pH 2 with hydrochloric acid and once more taken up into dichloromethane. After evaporation of the solvent, the resulting residue was chromatographed on silica gel using benzene with increasing amounts of acetone (until 1:1). There was obtained 4.4 g. of 1,2,3,4,10,19-hexanor-[5]9-oxo-5,9-seco-25D-spirostan-5-oic acid; M.P. 110–112° C. (from petroleum ether), $[\alpha]_D^{25}=-67°$ (in dioxan, c.=0.1).

We claim:

1. 1,2,3,4,10,19-hexanor-[5]9-oxo-5,9-seco-25D-spirostan-5-oic acid.

* * * * *